March 31, 1942.   R. S. BROWN   2,277,816
CHUCKING MEANS
Filed April 20, 1939
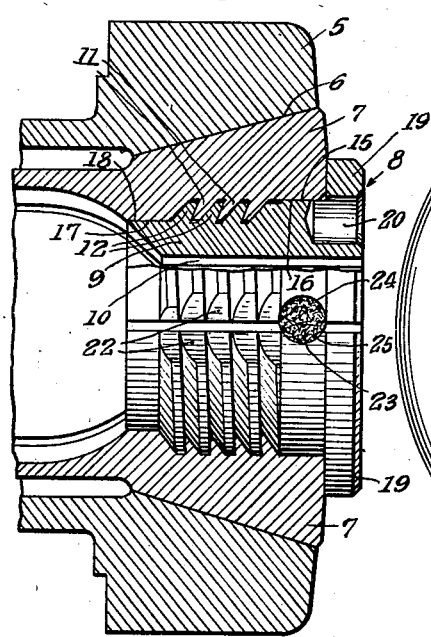
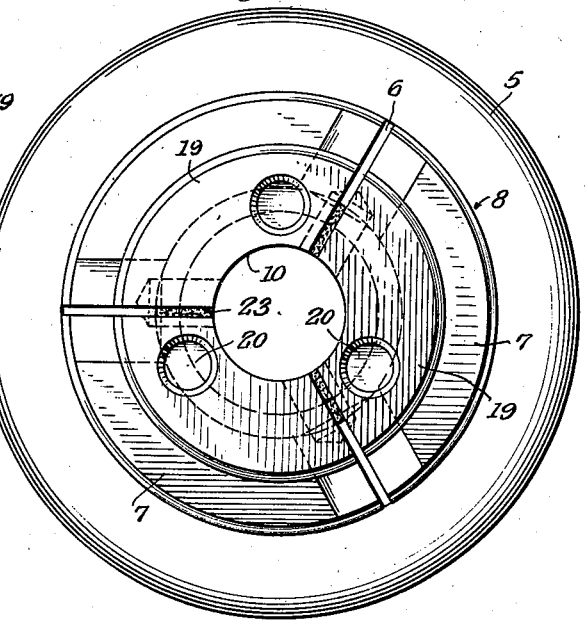
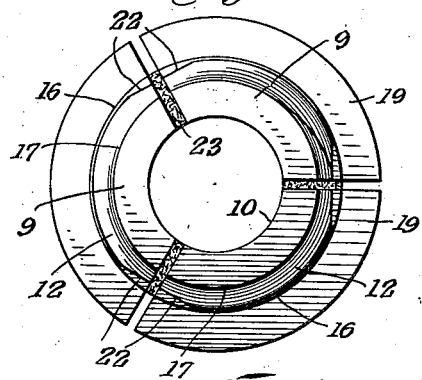
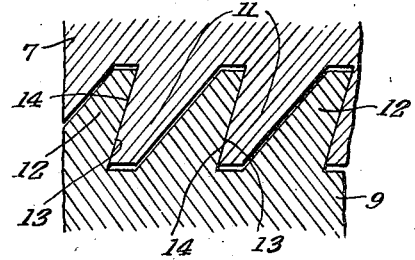
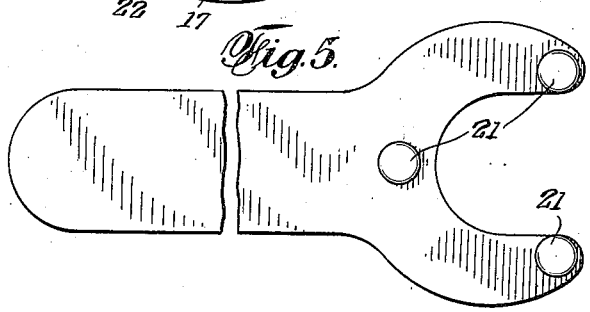
INVENTOR
ROBERT S. BROWN
BY
ATTORNEYS.

Patented Mar. 31, 1942

2,277,816

UNITED STATES PATENT OFFICE 2,277,816

CHUCKING MEANS

Robert S. Brown, New Britain, Conn., assignor to The New Britain Machine Company, New Britain, Conn., a corporation of Connecticut Application April 20, 1939, Serial No. 268,917

11 Claims. (Cl. 279—46)

My invention relates to a chucking means and more particularly to false jaws or pads for a collet.

Heretofore it has been common practice to provide pads for collet jaws, which pads generally have been held in place by screws passing radially inwardly through the collet jaws and into the pads. In order to replace such pads, it has been necessary to withdraw the collet from its seat in order to render the holding screws accessible. Furthermore the spaces between adjacent pads had to be sufficiently extensive to permit the jaws to be dropped radially inwardly in order to remove the same.

It is an object of my invention to overcome the above objections and to provide an improved means for securing pads in collets.

A more specific object is to provide improved means for holding pads on the jaws of collets constructed and arranged to permit axial application of the pads to the collet jaws without dropping the jaws toward the center during application or removal.

Another object is to provide a collet and pads therefor, and means for holding the same in place without the use of third members.

Another object is to provide a collet with pads, together with an improved form of holding means for urging the pads radially outwardly and longitudinally in one direction.

Still another object is to provide a collet and an improved form of pads therefor, wherein all pads may be simultaneously assembled with the collet jaws.

Another object is to provide an improved means for preventing chips and other foreign matter from working back between the pads.

Other objects and various features of invention will be hereinafter pointed out or will become apparent to those skilled in the art.

In the drawing which shows, for illustrative purposes only, a preferred form of the invention—

Fig. 1 is a view in central vertical section through a collet, one of the pads or false jaws being shown in partial vertical section;

Fig. 2 is a view in front elevation of the parts shown in Fig. 1;

Fig. 3 is a rear view in elevation of the pads shown in Figs. 1 and 2;

Figs. 4 is a fragmentary view on an enlarged scale, illustrating threads or camming means for pads;

Fig. 5 is a fragmentary view in elevation of a wrench for applying the pads to the jaws.

The invention will be described as embodied in a drawback type of collet, in which 5 indicates a spindle nose or other means having a rearwardly tapering collet seat 6, as will be understood. The collet embodies a plurality (in this case three) of jaws 7. The jaws 7—7 have rearwardly tapering surfaces for coacting with the seat 6, whereby upon drawing the collet axially inwardly the jaws will move radially inwardly to grip the stock, all as is common practice and will be understood.

I have provided pads or false jaws for the collet jaws, together with improved means for holding the pads in place. In the preferred form illustrated each jaw 7 is provided with a false jaw or pad 8 which may embody a generally cylindrical portion 9 extending back into the collet and provided with a properly formed surface 10 for engagement with the bar stock or work. The collet jaws and pads are provided with means in the form of camming surfaces for holding the pads in place on the jaws without the use of screws or any other similar members. In the form illustrated each jaw is provided with one or more internal screw threads 11 and each pad is provided with one or more coacting external threads 12—12. The threads or cam surfaces on the collet jaws and pads are undercut, that is to say, the rear surface 13 on the tooth 11 is sloped toward the right as indicated in Fig. 4 so as to provide an undercut, and the coacting surface 14 on the thread 12 is similarly sloped so as to form an undercut thread 12. The threads or cam members 11—12 preferably extend spirally and the threads of one jaw are continuations of corresponding threads in the next adjacent jaw. The same is true of the threads on the pads.

Each jaw 7 has one or more longitudinally extending surfaces for engagement by the pads for limiting outward radial movement. In the form shown, the jaw 7 has a generally longitudinally extending cylindrical surface 15 of the root diameter of the thread thereon. Each pad has a surface 16 for coaction with the surface 15. Each pad (in this case at the rear) has a generally longitudinally extending cylindrical pilot surface 17 of the root diameter of the thread thereon and each jaw has a surface 18 for coaction by the surface 17. The diameters of the surfaces 15, 16, 17, 18 are such that the pads may be assembled with and disassembled from the jaws by direct axial movement and without dropping the pads radially inwardly. Thus the spaces between adjacent pads may be reduced to a minimum. The jaws and pads likewise have abutments for limiting longitudinal movement of the pads on the jaws in one direction. In the form illustrated each pad has an outwardly extending flange 19 at the front which is adapted to come into engagement with the front face of the collet jaw.

Each pad preferably has a wrench engaging the part, such as the dowel-like hole 20 therein, and I may provide a wrench having properly spaced pins or dowels 21—21 thereon to engage within the dowel-like holes 20 of the pads so as to support the pads on the wrench during assembly or disassembly of the pads and jaws. The holes 20 are preferably slightly larger than the pins 21 so that when the pads are turned or screwed into place they may move radially outwardly, as will be described, without binding on the pins 21. When it is desired to apply the pads to the collet, the pads may be conveniently impaled or held on pins 21 of the wrench so that as a unit they form in effect a substantially continuous pad with a substantially continuous thread on the outer surface. The threads on adjacent pads are slabbed off at the adjacent ends as indicated at 22 to assist in catching the threads on the pads in the corresponding threads in the jaws. When the pads have been screwed in sufficiently, further inward movement will be stopped because of the engagement by the flanges 19 with the face of the jaws and slight further rotation of the jaws will cause the undercut or cam-like portions of the threads to cam the jaws radially outwardly so as to cause the surfaces 15—16, 17—18 to engage with each other and the pads will be tightly jammed in the jaws. Generally speaking, no other means for holding the pads need be provided, but if desired additional means, such as a set screw or the like, to prevent turning out of the pads may be provided.

In order to prevent chips or other foreign matter from working back in the space between pads, I may employ yielding plugs, such as the round felt plugs 23, which extend radially and act as a barrier against the entry of foreign matter between the pads. In the form shown the plug 23 is round and to receive such plug there is a round hole in the adjacent edges of the jaws. This hole is formed by arcuate surfaces 24—25 in the adjacent edges. The arcuate surface 24 is preferably greater than semi-circular in extent and the surface 25 somewhat less than a semi-circle. Therefore, the round plug 23 would normally be held by the arcuate surface 24 and the plugs prevented from accidental dropping out when the pads are removed and laid away.

It will be seen that by reason of my invention the pads may be held on jaws by means integral therewith and without the use of screws or any other holding devices. The pads may be very readily applied and removed by a simple rotation and axial movement thereof and without dropping the jaws radially inwardly as is common with pads now generally employed. When the threads are properly handed in relation to the direction of rotation of the collet, the pads tend to tighten up in use and there is little likelihood of the working loose of the pads. The inertia or rotational lag of the stock in the collet tends to tighten the pads therein and drills or turning tools acting on the bar stock tend to turn the pads in the direction to tighten them. The pads are therefore self-tightening. The pads are very solidly held in the jaws by reason of the fact that when the jaws are screwed up tight the flange 19 is in solid abutment with the face of the jaw.

While the invention has been described in considerable detail and a preferred form illustrated, it is to be understood that various changes may be made within the scope of the invention as defined in the appended claims.

I claim:

1. A collet having a plurality of jaws, pads for said jaws, said jaws and pads having interengaging spirally formed undercut cam surfaces, and jamming means for holding said pads on said jaws and against displacement transversely of the axis of the collet.

2. A collet having a plurality of jaws, pads for said jaws, said pads and jaws having interengaging undercut screw threads, and jamming means for holding said pads on said jaws and against displacement transversely of the axis of the collet.

3. A collet including a plurality of jaws, pads for said jaws, said jaws having undercut threads thereon and said pads having coacting undercut threads for coaction with the threads on said jaws, and jamming means for holding said pads on said jaws and against displacement transversely of the axis of the collet.

4. A collet including a plurality of jaws, pads for said jaws, said pads and jaws having generally longitudinally extending surfaces for limiting outward radial movement of said pads on said jaws, said jaws and pads having engaging integral cam means for camming said longitudinally extending surfaces into engagement with each other and urging said pads longitudinally in one direction on said jaws, said jaws and pads having mutually abutting surfaces to limit relative movement between said jaws and pads in said direction.

5. A collet including a plurality of jaws, pads for said jaws, said jaws collectively having a substantially continuous internal undercut screw thread thereon, said pads collectively having a substantially continuous external undercut screw thread thereon, whereby said pads collectively may be screw threadedly engaged with said jaws and means for causing said threads to jam and hold said pads securely on said jaws.

6. A collet including a plurality of jaws, pads for said jaws, said jaws having undercut screw threads therein and said pads having undercut screw threads thereon for coaction with the screw threads on said jaws, whereby said pads upon rotation relatively to said jaws will be moved longitudinally of said jaws, said jaws and pads having generally radially extending surfaces for limiting relative longitudinal movement of said jaws and pads in one direction, said jaws having generally longitudinally extending surfaces at about the root of the thread therein, said pads having surfaces to coact therewith, said pads having generally longitudinally extending surfaces substantially at the root of the thread thereon and said jaws having surfaces to coact therewith, for the purpose described.

7. A collet including a plurality of jaws, pads for said jaws, said jaws and pads having coacting means for causing longitudinal positioning of said pads on said jaws upon relative rotation between said jaws and pads, said pads having wrench engaging means and a wrench having means for engagement with said wrench engaging means for supporting said jaws on said wrench, for the purpose described.

8. A pad for a collet including a member having a longitudinally inner generally cylindrical pilot surface on its outer side and a longitudinally forward generally cylindrical seating surface on its outer side, the radius of the seating surface being greater than that of the pilot surface, and a locking means on said pad and located between said pilot and seating surfaces, said locking means comprising a spirally formed undercut cam member integral with the pad, said pad having a generally radially extending jamming surface.

9. A pad for a collet including a segmental member having a longitudinally inner generally cylindrical pilot surface on its outer side and a longitudinally forward generally cylindrical seating surface on its outer side, the radius of the seating surface being greater than that of the pilot surface, and a locking means on said pad and located between said pilot and seating surfaces, said locking means comprising segmental undercut screw threads integral with the pad, said pad having a generally radially extending jamming surface.

10. A collet, having a plurality of jaws, pads for said jaws, said pads and jaws having interengaging generally circumferentially extending camming surfaces and said jaws and pads having interengaging generally circumferentially extending jamming surfaces, said camming surfaces and at least one of said jamming surfaces being inclined to each other in a generally circumferential direction, at least one of said surfaces on said jaw and the coacting surface on said pad being undercut.

11. A collet, having a plurality of jaws, pads for said jaws, said pads and jaws having interengaging spirally formed camming surfaces, said jaws and pads having jamming surfaces for jamming said spirally formed camming surfaces, at least one of said surfaces on said jaw and the coacting surface on said pad being undercut.

ROBERT S. BROWN.